Feb. 2, 1943. C. H. HUGHES 2,309,959
PROCESS FOR COKING CARBONACEOUS MATERIAL
Original Filed Oct. 25, 1939 8 Sheets-Sheet 1

INVENTOR
Charles H Hughes
BY
ATTORNEY

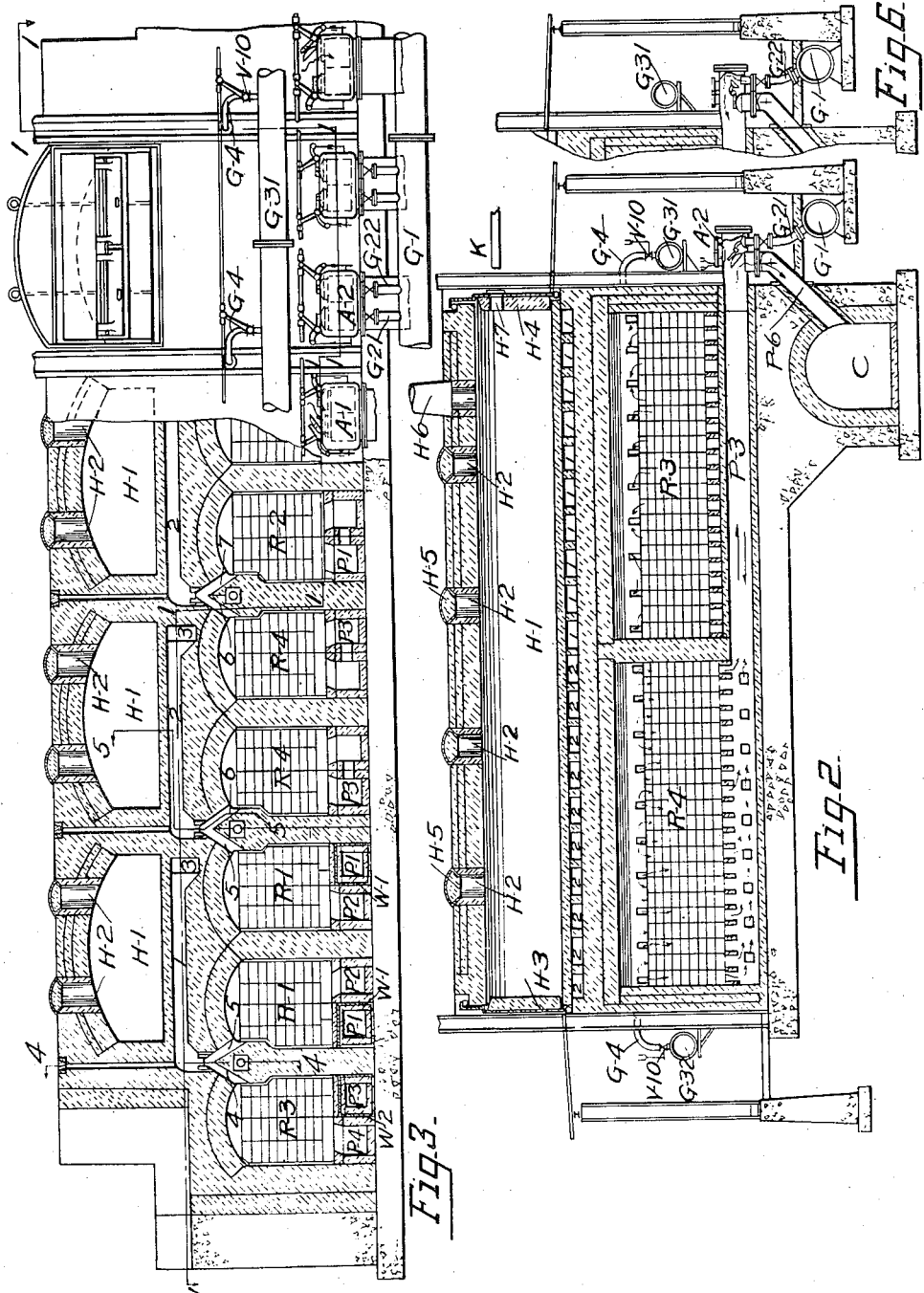

Feb. 2, 1943.   C. H. HUGHES   2,309,959
PROCESS FOR COKING CARBONACEOUS MATERIAL
Original Filed Oct. 25, 1939   8 Sheets-Sheet 3
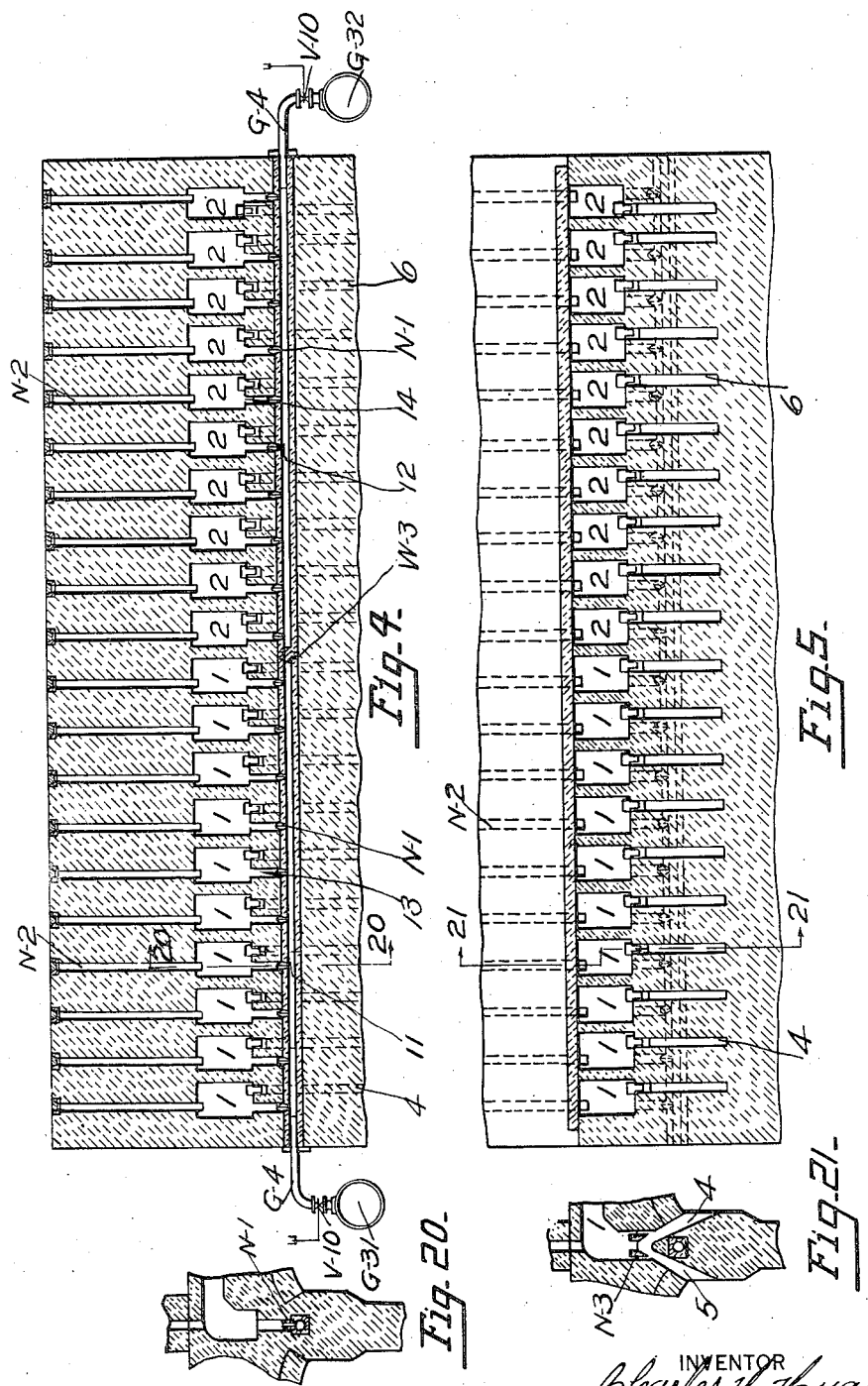

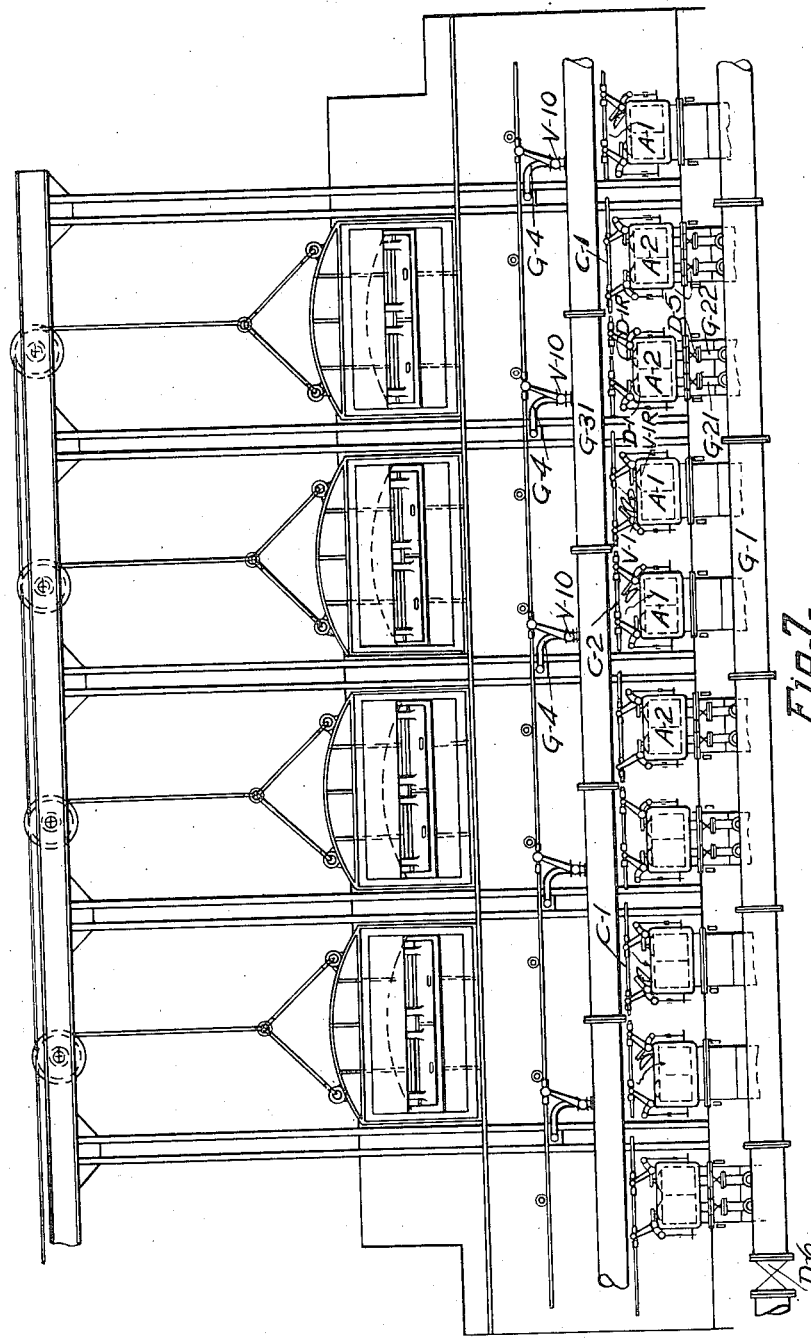

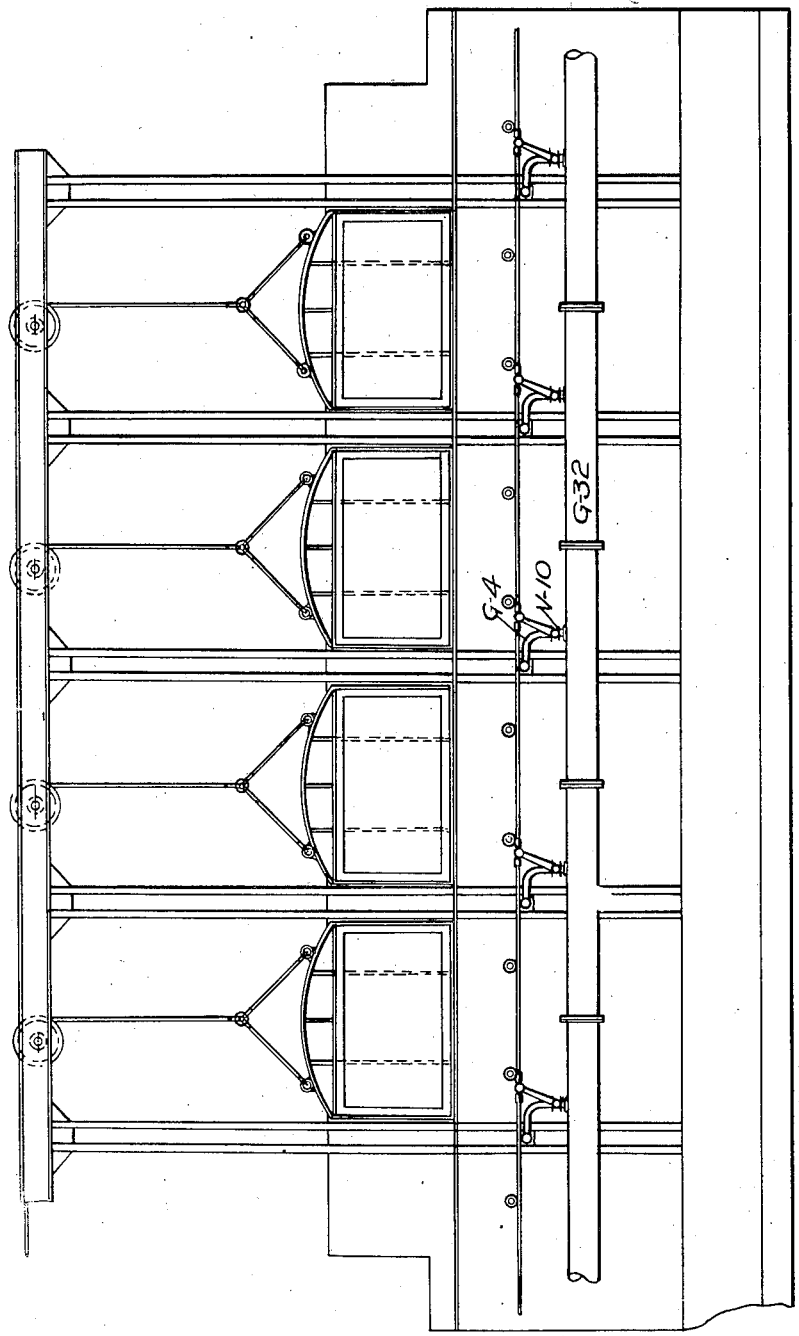

Feb. 2, 1943.  C. H. HUGHES  2,309,959
PROCESS FOR COKING CARBONACEOUS MATERIAL
Original Filed Oct. 25, 1939    8 Sheets-Sheet 6

INVENTOR
Charles H. Hughes
BY
ATTORNEY

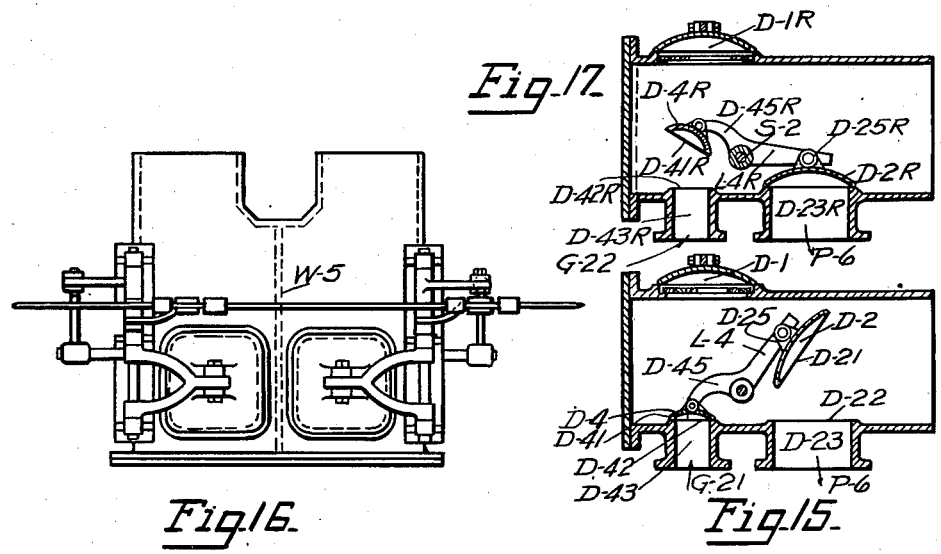
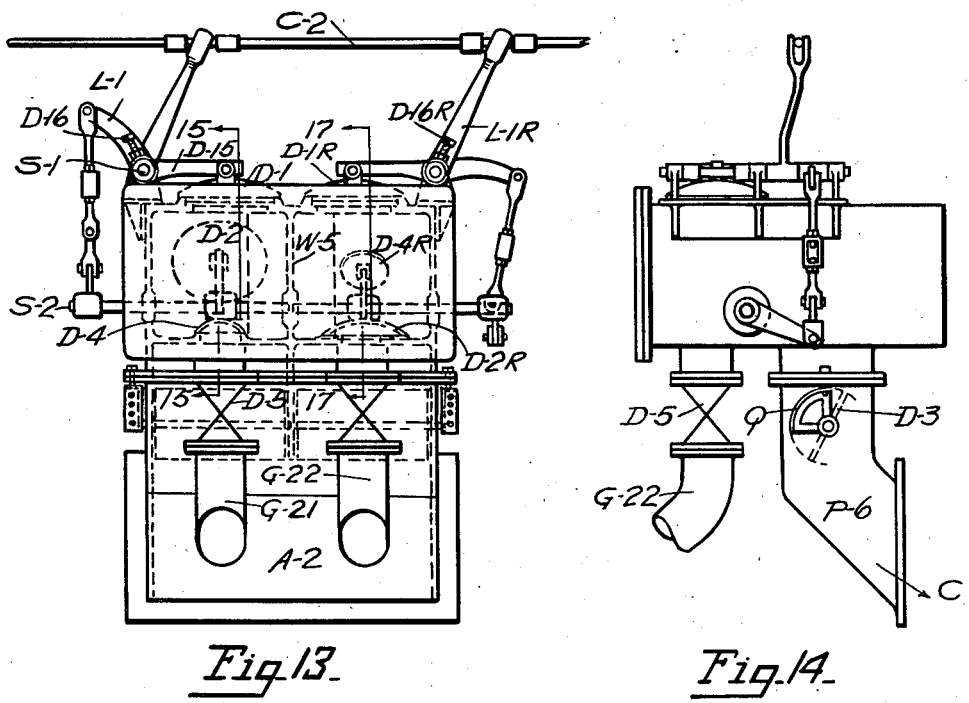

Patented Feb. 2, 1943

2,309,959

UNITED STATES PATENT OFFICE 2,309,959

PROCESS FOR COKING CARBONACEOUS MATERIAL

Charles H. Hughes, Glen Ridge, N. J., assignor to Hughes By-Product Coke Oven Corporation, New York, N. Y., a corporation of New York Original application October 25, 1939, Serial No. 301,173. Divided and this application March 1, 1941, Serial No. 381,358

4 Claims. (Cl. 202—12)

The present invention relates to a process for coking carbonaceous material and, more particularly, to a process for coking coal.

It is well known by those skilled in the art that in the earliest times coke was produced in mound-shaped Meilers similar to the old method of burning charcoal in heaps. The beehive oven was a modification of these, except that it was built of brick instead of sod or clay, and the earliest record of coking coal in a regular oven is an English patent to St. John granted in 1620 for making coke in a beehive form of oven. Although a German chemist, Becher, received a patent in 1700 for recovering tar from coking coal, it appears that it was not until Clayton's discovery in 1737 that the formation of a combustible gas when coking coal was noticed. About the year 1767, a form of coke oven, producing coke and recovering some tar and ammonia, was constructed in Germany and was described as a dome-like fire clay retort. In 1781, an attempt appears to have been made to recover the by-products, and a patent to the Earl of Dundonald was issued, and in 1792 Murdoch experimented with making gas from coal in retorts. These efforts bore fruit, and twenty years later the streets of London were lighted by gas.

The earliest records of the rectangular, or retort, ovens show them in operation in Germany about 1830. They had open walls, pierced by horizontal and vertical flues, and the walls formed a rectangular space which contained the charge. In 1856, Knab is reported to have built a group of retort coke ovens to recover by-products and illuminating gas. These ovens had flues on the bottom only, but of course, no regenerator or recuperator system was provided. Moreover, there was no attempt to furnish uniform heating to the oven sole, the fire or flame passing from a grate through a central flue and then returning through the flues on both sides thereof. The following year, Appolt built his first ovens in the shape of vertical and, later, horizontal retorts, using his gas only for heating his oven through horizontal flues. This was about the earliest closed retort coke oven, utilizing the gas for its own heating. By 1861 the Coppee coke oven of Belgian invention was in use on the Continent, and in 1873-74 it was introduced into England. It had vertical flues and was of the non-recovery type.

About 1862 Carves of France introduced side flues in addition to the bottom flues of Knab. About 1880, Simon, an English inventor, improved the Carves oven very materially by adding recuperating flues. This oven had the oven flues placed horizontally, the gas and air being first burned in sole flues located underneath the oven chambers, then passing up through a riser to the ovens and down through three horizontal flues in series. In the years 1881 to 1883, Seibel patented an oven having horizontal flues and having neither grates nor regenerators. It is apparent that oven designs up to this time were so uneconomical of gas used in heating the ovens, or the coals were so lean in gas, that grates for burning coal were built into the ovens and the gas was first admitted over these grates, the amount of coal being such as to supply the required additional heat.

The first ovens of the Otto type had been erected in Germany in 1881, and in the same year Huessner appropriated the Knab-Carves model and built a hundred ovens in Germany, thus establishing the industry on a sound basis in that country, although the quality of coke from these ovens was inferior. In these ovens the flues were horizontal. A very substantial improvement was made by Hoffman, who added the Siemens regenerator to the Otto coke oven and thus provided the first really efficient coke oven, generally referred to in the art as the Otto-Hoffman coke oven. In 1888 Festner, a German inventor, changed the Otto-Hoffman design by using horizontal instead of vertical flues and abandoning the Siemens regenerators, replacing the same with a Ponsard gas furnace. Hoffman cooperated with Festner, and this design was called a Festner-Hoffman oven, having horizontal flues and recuperators. In 1887, the Semet-Solvay oven came into notice, the first of them having no recuperators or regenerators. It appears that the principal features of Semet's design were the introduction of the division wall, the building of the oven flue system as a sleeve out of D-shaped tile, and the starting of the combustion at the top, or No. 1, flue, and, in general, providing a structure which was strong, easily heated and had a reservoir of heat in the division walls.

From the foregoing historical survey of the development of the coke oven art, it appears that all designs of ovens for coking coal sprang from four roots classified as follows:

1. The beehive oven, which was developed from the mound of charcoal burners.

2. The Coppee oven, with vertical flues in the oven walls, these ovens being built narrow, long and high.

3. The Knab broad oven, with flues underneath.

4. The Knab oven modified by Carves, with the oven flues horizontally in the side walls as well as underneath.

The high, narrow coke ovens of the prior art described in the foregoing had various important disadvantages. For instance, a recent standard type was usually of the order of about 45 feet in length, about 16 feet high, and about 17 inches in width, and, because of its height and narrowness, it had to be constructed and built in very large individual units, so that the original cost of installation was extremely high. Generally speaking, it was not possible either to build or to operate relatively small units of the conventional type at a low cost.

Besides these economic disadvantages, the use of a high, narrow oven was limited to certain coals or coal mixtures. Coals which expanded upon coking could only be used if mixed with shrinking coals, as otherwise the wear on the walls was too great, and the increasing pressure might have led to destruction of the ovens. Using a large percentage of shrinking coals, as necessarily became general practice, the coal shrank away from the heating walls, causing the formation between coke and wall of irregular gaps and crevices which acted as channels for the gases distilled from the coal. Due to the irregularity of these channels, heat could not be applied so as to produce a uniformly carbonized coke in a short coking period, regardless of the method of heating or control employed.

It is well known in the art that channeling brought the rich gases into immediate contact with the highly heated refractory walls, producing two unfortunate results. First, the contact of the crude gases with some 1440 square feet of brick at the highest temperature in the oven caused the destruction of a part of the valuable by-products contained in the gases. Secondly, the gases acted as an insulator between the hot walls and the coking coal, preventing considerable heat from reaching the charge by conduction. Again, the gases, being much lower in temperature than the walls, took up considerable heat from them and thus prevented this amount of heat from reaching the core of the charge at all. Both of these effects resulted in greatly retarding the coking time and were diametrically opposed to the results desired, for it was, of course, the purpose of the operation to transfer heat from walls to coal charge as efficiently as possible and in the shortest time. Moreover, the heating of the gases had the undesirable effect of passing the gases to the by-product plant in a super-heated state, necessitating larger condensing surfaces to cool them.

A further disadvantage of the high narrow coke oven was that the width of the charge varied over the length of the oven, for practical reasons being smaller at the pusher end than at the coke discharge end. For the purpose of providing uniform coking throughout this constantly varying oven width, more gas had to be burned in the flues at the coke end of the oven, necessitating a difference in size of heating flues over the length of the oven. This required very accurate control of the fuel gas to the individual flues.

Under these conditions, it was difficult to control heating conditions in these ovens, the oven structure was intricate and expensive, resulting in high-cost coke, and the coke produced was primarily suitable only for metallurgical purposes and not for domestic use. Subsequently, a broad rectangular sole-fired coke oven attempting to eliminate these disadvantages was developed, but other difficulties arose.

Essentially, this broad oven construction provided a rectangular sole-fired coke oven having a multiplicity of long, independent, parallel heating flues arranged side by side, each of said flues being directly connected at each end to two shallow, horizontal hair-pin regenerators below and parallel to and individual to each separate heating flue for alternately supplying heated air to the flues and receiving the heat of waste gases discharged therefrom. Each heating flue was provided with a burner or means for supplying rich fuel gas to both ends thereof.

In this manner, all of the flames burned in independent flues, entirely isolated from each other. These flames were all at one end of the long oven and extended in the dirction of the other end, usually some forty-odd feet away. Burners were located at each end of the flues, and each heating flue and its associated regenerators could thus be alternately operated, independently of adjoining heating flues and regenerators.

It is particularly to be noted that the oven described could be used with rich fuel gas only, as no provision was made for preheating the fuel. Since efficient operation with lean fuel gas required that it be preheated before passing to the burners, it is obvious that this oven was limited as to its source of heat. This raised a serious problem, as the prices at which fuel gas could be bought or manufactured fluctuated considerably, and it was not at all unusual for the costs of lean and rich gas so to vary with respect to each other that they actually competed with each other for a market. Operators could not take advantage of this economic situation, of course, when they could not possibly employ the lean gas.

Although this conventional type of broad oven could be built in relatively small units, the entire heating system and the so-called regenerators employed were fundamentally incorrect. The oven was designed for underfiring with rich coke oven gas only. The use of coke oven gas with preheated air gave a short and hot flame resulting in nonuniform heating of the long, straight parallel heating flues. An excessively high temperature occurred at each burner, producing danger points or hot spots. Moreover, the regenerators were so designed that the waste gas and incoming air always circulated in a horizontal direction which failed to give satisfactory and efficient results.

In other words, by eliminating some of the disadvantages of prior ovens, the broad oven described introduced new difficulties which were in part much more serious than the former. Thus, the ends of the heating flues were overheated, causing overcoking and quick overheating of the construction material of the oven. The heat thus furnished in excess at the ends of the flues did not, however, propagate itself in sufficient amount along their length. The flues were so long, running (as they did) the entire length of the oven, that black spots, too cold for proper coking, developed at their centers. Clearly, it was practically impossible to obtain proper coking of the center mass except, and then to only a small extent, by overcoking the masses at the ends of the flues. While this defect was sought to be remedied by Zwillinger, who put a division wall at the center to halve the flue length and simultaneously burned flames at both ends of the oven toward this wall, this arrangement provided no real solution to the problem. It merely substituted for the oven-length flue a semi-oven-length flue, still far too long for the flame to heat it properly. There were still cold black spots at the oven centers in the vicinity of the division wall.

Then, too, the broad oven described did not provide adequate space above and below the regenerators in which the gases could spread or mushroom out before going through the checker-brick. Moreover, the regenerators, which were individual for each flue, were insufficient in size and could not function satisfactorily. The velocity of the gases in the heating flues was too low and in the regenerators too high for proper heat transfer. Of course, not only did this non-uniform distribution of heat greatly decrease the over-all efficiency of these ovens, but, especially, the hot spots, developed in the operation of the oven, caused early deterioration of the building material and greatly increased the cost of operation and maintenance. Although these difficulties were well known in the art, and, from time to time, various suggestions and proposals were made to eliminate them, none of these suggestions and proposals, so far as I am aware, was completely satisfactory and successful on a practical and industrial scale.

I have discovered that the outstanding problem may be solved in a simple and completely satisfactory manner.

It is an object of the present invention to provide a process for coking carbonaceous material which eliminates the aforementioned difficulties experienced in the operation of conventional broad coke ovens.

It is another object of this invention to provide a process of coking coals, tars and oils to produce a coke substance with burning characteristics different from those of coke produced heretofore by prior art processes.

It is a further object of the invention to provide a coking process which is easily adaptable to the coking of any carbonaceous material, such as coal, peat, tar, lignite, pitch, culm waste and other low grade coals, fuel oil, bunker oils and other petroleum products, and the like.

It is also an object of the invention to provide a coking process for coking a broad flat layer of coal to produce a coke of far greater suitability for domestic purposes than that produced in the high, narrow walls of the prior art.

The invention also provides a process for coking coal in a thin layer to permit the free flow of hot evolved gases whereby an open cell structure results.

The invention also provides a coking process wherein combustible gases at a temperature sufficient to coke carbonaceous material are directed in a plurality of parallel streams beneath said material, transversely thereto and out of contact therewith, whereby substantially uniform coking of said material can be obtained.

My invention also contemplates the provision of a process for coking coal wherein either rich fuel gas or, alternately, preheated lean fuel gas can be employed as the fuel source for raising the temperature to a point sufficient for coking the coal.

Other and further objects and advantages of the invention will become apparent from the following description taken in conjunction with the accompanying drawings, in which:

Fig. 2 depicts a vertical longitudinal sectional view through the oven, heating flues, regenerators and single chimney flue, taken on line 2—2 of Fig. 1;

Fig. 3 shows a fragmentary front elevational view, partly broken away to reveal a vertical transverse section through the ovens, heating flues and regenerators taken on line 3—3 of Fig. 1;

Fig. 4 is a vertical longitudinal section through the gun brick, rich gas burner nozzles, heating flues and peep holes, taken on line 4—4 of Fig. 3;

Fig. 5 is a similar view through the ducts connecting the heating flues with the regenerators, taken on line 5—5 of Fig. 3;

Fig. 6 illustrates a vertical sectional view, taken on line 6—6 of Fig. 1, showing the position of the valves in the gas box when underfiring the ovens with lean fuel gas;

Fig. 7 depicts a front elevational view of the pusher side of the oven battery, showing the integrated gas and air boxes and the gas manifold piping;

Fig. 8 depicts a similar view of the coke side of the oven battery, showing the gas manifold piping;

Figs. 13, 14, 15, 16 and 17 show the constructional details of a single box for lean fuel gas and waste gas;

Fig. 20 is a vertical cross-section through one of the rich gas ports connecting the gun bricks with the heating flues, taken on line 20—20 of Fig. 4; and Fig. 21 is a vertical cross-section through the air and lean gas ports connecting regenerators with heating flues, taken on line 21—21 of Fig. 5.

Figure 1:
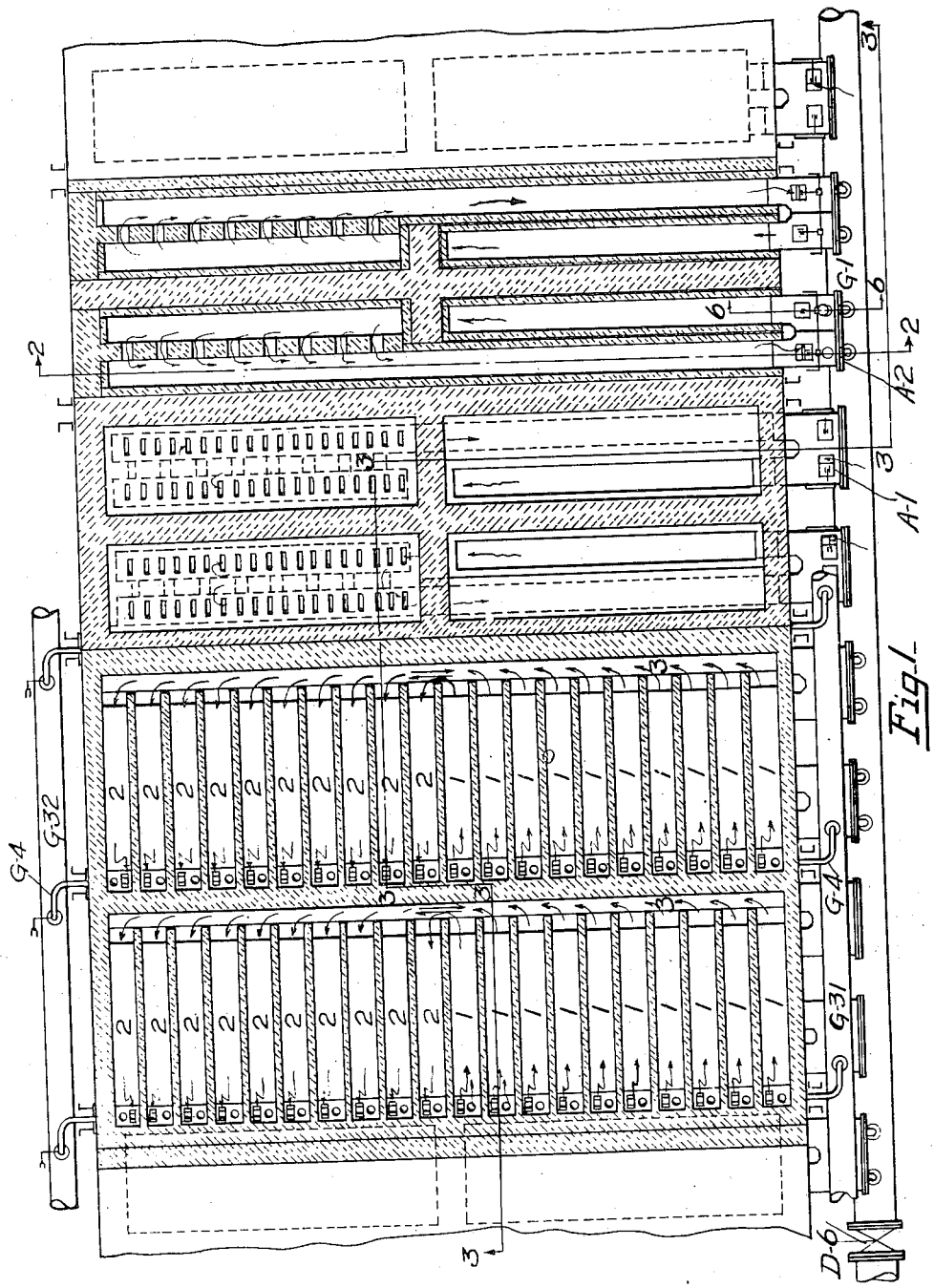
Fig. 1 illustrates a sectional plan view of an oven embodying the principles of the present invention, taken on line 1—1 of Fig. 3.
Figure 11:
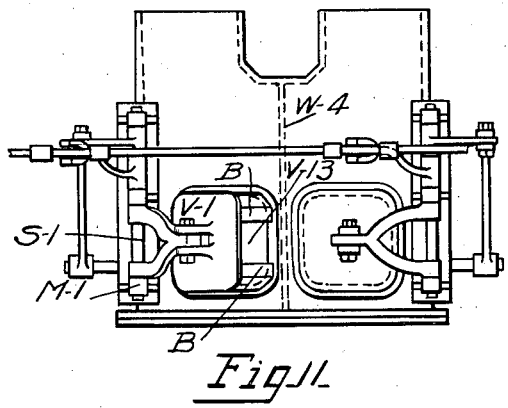
Figs. 9, 10, 11 and 12 show the details of construction of a single box for air and waste gas.
Figure 12:
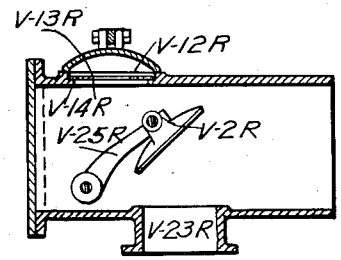

Broadly stated, the present invention relates to a process for coking a broad, flat layer of carbonaceous material in a coking chamber, wherein it can be sealed against the admission of air. A flow of combustion gases at a temperature sufficient to coke the carbonaceous material is directed in a plurality of parallel streams beneath the sole of said chamber and transversely thereto. The flow of combustion gases originates beneath and along one half of a single side of the chamber sole, flows across the oven underneath said sole, and finally flows back to the same side of the sole and at the other half of said side. The flow is alternately reversed to provide substantially uniform coking of the carbonaceous material. The process can be satisfactorily carried out in a rectangular broad coke oven heated with a plurality of short, parallel heating flues located beneath the floor of the oven and placed transversely of the oven, all interconnected at one side of the oven by a passage running its entire length. A dual heating system adapted to furnish either lean or rich fuel gas for combustion in the heating flues is provided, and means are incorporated in the oven structure for reversing the flow through the heating system of preheated lean fuel gas, preheated air, and waste gas, using valves upon a single side of the oven battery and using a single chimney flue continuously. This circulation is maintained by the use of unit gas and air boxes, each of which is divided into two passages which are used simultaneously and in alternate succession either for air and waste gas or, alternatively, for fuel gas and waste gas. The heating system may be said to be divided into two sections, the hot gases flowing in them in opposite directions and each section being provided with two parallel vertical regenerators. These regenerators have spacious, chamber-like passages both above and below the checkerbrick, giving the gases an opportunity to spread or mushroom out before passing through and thus increasing the time of contact and affording more effective heat transfer. Each regenerator is constructed and arranged to preheat either air or lean fuel gas and, on alternate reversals, to recover the heat from waste gas. The improved oven is so designed that it may also be used for underfiring with rich fuel gas. When rich fuel gas is used, all regenerators are employed alternately for preheating air for combustion and for recovering heat from hot waste exit gases.

A coke oven suitable for carrying out the process of the invention will now be more fully described to those skilled in the art, reference being had to the accompanying drawings illustrating a preferred embodiment thereof. Similar reference characters denote corresponding parts throughout the various figures.

Figure 9:
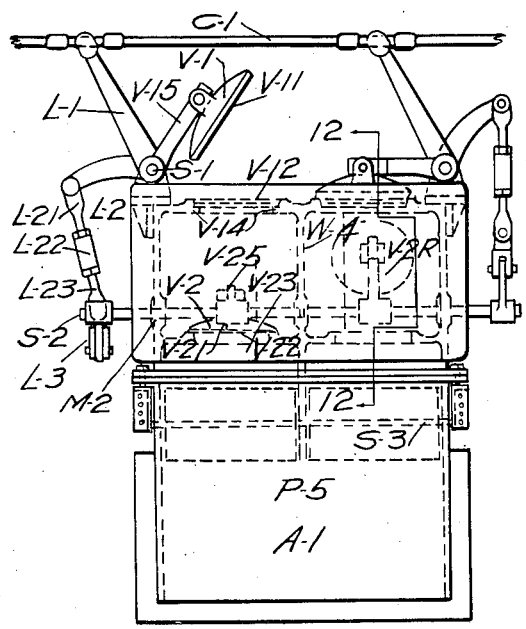
Figure 10:
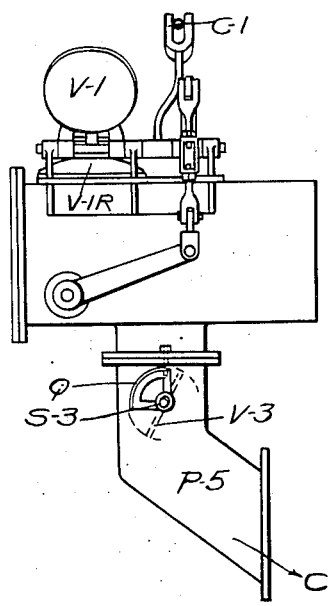

Referring, now, more specifically to Figs. 1 to 3, it is readily observed that the oven battery of my invention comprises a plurality of domed, rectangular, broad coking chambers H—1 having charging holes H—2 in their roofs. Beneath each of these chambers are arranged in transverse position a plurality of parallel heating flues, one half of which are denoted by reference character 1; the other half are denoted by reference figure 2. All of these heating flues are connected at one end thereof with a common longitudinal flue 3. Heating flues 1 are connected at the other flue end with ducts 4 and 5 and, through these ducts, to regenerators R—3 and R—1, respectively. Heating flues 2 are connected at the other end thereof with ducts 6 and 7, and, through these ducts, to regenerators R—4 and R—2, respectively. This end of the heating flues, where the connecting ducts to the regenerators open into the flues to form a Y-junction, is the firing end, and burning means is here provided. The oven is provided with valvular means, such as the two combination valve or damper boxes A—1 and A—2, a preferred construction of which will be described infra. Regenerator R—1 is connected by a passage P—2 with valve box A—1 and thence by a passage P—5 (see Figs. 9 and 10) with a single chimney flue C. Passage P—2 runs underneath the entire length of regenerator R—1, and the whole top of the passage is open to the mushrooming chamber under the checkerbrick of the regenerator. However, passage P—2 occupies only half the width below regenerator R—1, being separated by a division wall W—1 from a passage P—1 which is closed off at this section and does not communicate with this regenerator. It is important that cross-leakage between these two passages be prevented, and to that end passage P—1 is encased in an impermeable sleeve, preferably of ¼ inch alloy steel or the like, which is made of heat and corrosion resistant material, such as nickel-chromium steels or chromium steels or the like. Passage P—1 runs the full length of the oven, being closed off as described under regenerator R—1 but open at the top for that half of its length under regenerator R—2, where it communicates directly with the mushrooming chamber under the checkerbrick. Regenerator R—2 is connected by this passage to valve box A—1 and through this valve box and passage P—5 to the single chimney flue C. Regenerator R—3 is connected by a passage P—4 to valve box A—2 and through this valve box and a passage P—6 to chimney flue C. Passage P—4 is similar in construction to passage P—2 described supra, and it bears exactly the same relationship to regenerator R—3 that passage P—2 bears to regenerator R—1. Likewise, a passage P—3, encased similarly to passage P—1, runs under regenerator R—3 and communicates with regenerator R—4 in exactly the same manner that passage P—1 connects with regenerator R—2. A division wall W—2 separates passages P—3 and P—4 from each other. Regenerator R—4 is connected through the passage P—3 to valve box A—2 and thence by passage P—6 to chimney flue C.

A lean fuel gas manifold G—1 runs the length of the pusher side of the oven battery and is connected by risers G—21 and G—22 to valve box A—2 on each oven. Rich gas manifolds G—31 and G—32 run the length of the oven battery on opposite sides thereof and connect through valves V—10 (shown diagrammatically) with risers G—4, which lead into gas supply channels in the division walls between the ovens. The valves in the gas connection pipes G—4 are connected in the usual manner by a cable to the drum of a standard reversing mechanism (not shown), or other valve-actuating means can be employed.

A reference to Figs. 4 and 5 will afford those skilled in the coke oven art a ready understanding of the construction at the firing end of the transverse flues into which the gas supply channels lead. Extending crosswise of the oven battery in the division walls between the ovens, which is to say at the firing end of the transverse heating flues, are two gas supply channels of gun brick 11 and 12. These gun brick are not connected at the point of meeting on the center line of the oven battery, but are separated by a division wall W—3. The gun brick 11 on the pusher side of the battery is connected through the valve controlled connection pipe G—4 with gas manifold pipe G—31, while the gun brick 12 on the coke side is connected through the valve controlled connection pipe G—4 with gas manifold pipe G—32. The gun brick is connected by a series of ducts 13 to each of heating flues 1, and similarly channel 12 connects with heating flues 2 by ducts 14.

Within ducts 13 and 14 are orifice gas nozzles N—1. Above them, running from the top of the heating flues to the top of the oven, are openings N—2, through which a special tool may be employed either to replace these nozzles with other nozzles or to regulate the flow of preheated air (or lean gas, when used) from ducts 4, 5, 6 and 7 into heating flues 1 and 2. A detail of the Y-junction point of ducts 4 and 5 into flue 1 is depicted at Fig. 21. Each Y-junction from the ducts above the regenerators into the heating flues is provided with a pair of sliding bricks N—3, the position of which determines the size of the port and hence regulates the flow.

The valve boxes may be of any suitable design and appropriate construction, as those skilled in the art will readily understand. It is preferred, however, to use the two types of valve boxes illustrated, respectively, by Figs. 9 to 12 and Figs. 2, 6, and 13 to 17. It is to be observed that the preferred form of valve box adapted to handling air and waste gas, as illustrated in Figs. 9 to 12, has a single housing A—1, preferably a suitable metal casting, as of a corrosion-resistant material, such as alloy cast iron of the chromium or the chrome-nickel type or the like. Both right and left hand boxes are required, the boxes being identical in design but mirrored as to each other in assembly, as shown in Fig. 7, and they are operated by different cables. Moreover, each box is divided by a wall W—4 into two substantially equal and entirely separate halves. Except that the parts are positioned enantiomorphically, the valves or dampers and the means for operating them in each half are identical. For this reason, only one half will be described.

On the left hand side of the box, there is mounted at the top thereof an air inlet damper or valve V—1 of rectangular shape with rounded corners, the face V—11 of which is adapted to make a substantially air-tight contact with the seat V—12 of a rectangular port V—13 in the top of the box or housing. Slightly projecting shelves V—14 on each of two opposite sides of the opening V—13 just below seat V—12 provide a seat upon which removable air-regulating bars B can be placed. The valve V—1 is supported by a valve stem V—15 which is keyed to a rotatable shaft S—1. The shaft is held in position by a suitable sleeve mounting M—1 which is rigidly fastened to the housing.

Inside the valve chest thus formed, there is mounted a waste gas exit damper or valve V—2, the face V—21 of which is adapted to make a substantially air-tight contact with the seat V—22 of a port V—23 at the bottom of the box. This port forms the upper end of passage or duct P—5 which connects the valve chamber with the chimney flue C. The valve V—2 is supported by valve stem V—25, which is keyed to a rotatable shaft S—2. This shaft is mounted in a suitable sleeve mounting M—2, which is rigidly fastened to valve box A—1, and the shaft extends through the left side of and outside the box.

Keyed to one one of rotatable shaft S—1 is the fulcrum of a bell crank L—1. The bell crank has a straight arm which is connected by a suitable connection to a cable C—1 which runs along the entire battery of ovens. The other arm of the bell crank is curved outward and over the edge of box A—1 and at its end it connects with an adjustable rod L—2. This rod comprises three parts: the upper part L—21, connecting at the upper end thereof with the bell crank and with its lower end threaded; a turnbuckle L—22, which is screwed onto the threaded end of L—21, and a lower part L—23, having either a swivel or a thread at its upper end adapted to coact with L—22 and connected at its lower end to a lever L—3. Lever L—3 is keyed to the end of shaft S—2 which protrudes from the side of the valve box. The turnbuckle is adjusted to make rod L—2 of such length that air valve V—1 is open when waste gas damper V—2 is tightly closed, and vice versa.

In passage P—5 there is a rectangular plate damper V—3 adapted to close off the passage in any degree required. It is mounted on a shaft S—3 which forms its longitudinal axis. This shaft extends the width of the passage, and one end of it passes through the left side of the passage. The shaft is suitably mounted in the sides of passage P—5. To the end of shaft S—3 which protrudes from the side, a quadrant Q is attached.

The reversing mechanism for operating the air and waste gas dampers is not shown, as those skilled in the art are familiar with the construction and operation. It may be briefly described as consisting of a motor driven drum around which the cable C—1 is wound. A time clock, which is set for fixed reversal periods, is adapted to make the necessary electrical contacts required for starting and stopping the motor and for shifting the gears which change the direction of travel of cable C—1. The cable is adapted for alternately opening and closing all dampers as required. As each valve box is divided into left and right hand halves, the same travel of cable C—1 which opens air valve V—1 and closes waste gas valve V—2 on the left side of the box closes air valve V—1R and opens waste gas valve V—2R on the right side of the box. Similarly, cable C—2 (see Fig. 7) is adapted for alternately opening and closing the valves on alternate air-waste gas valve boxes A—1, which, though identical in design and operation with those operated by cable C—1, are mirror assemblies of them.

The valve box which I prefer to use for handling lean fuel gas and waste gas is very similar in design and construction to the air and waste gas valve box just described. Likewise, both right and left hand boxes, operated by different cables, are provided, as with the air-waste gas valve boxes. Each box, too, has a single housing A—2, preferably of the same material as that of housing A—1, and is also divided into two enantiomorphic halves by wall W—5. The same system of levers and shafts is used as described supra, so that, except for a few salient differences, no detailed description will be given here. The reference characters in Figs. 13 to 17 have been kept the same as far as possible, merely using a different initial letter, where necessary for identification. Also, Figs. 13 to 17 correspond to Figs. 9 to 12 in that they depict the positions of a fuel gas-waste gas valve box and an air-waste gas valve box, respectively, for the same oven (here the fourth from the left, for example, in Figs. 3 and 7) at the same moment of time. For this reason, the construction and operation of the box will be described with respect to cable C—2, though it will be appreciated that alternate fuel gas-waste gas valve boxes A—2 are controlled by cable C—1. Cables C—1 and C—2 travel in opposite directions at any time interval, so that, for an individual oven, where cable C—1 operates the air box, C—2 operates the gas box, and vice versa.

Referring only to the left hand half of the valve box, air inlet valve or damper D—1 is mounted in a position similar to that of valve V—1 in housing A—1. The valve stem D—15 is mounted with a set screw D—16, however, adapted to key or unkey the stem to shaft S—1. By this device, the air inlet valve D—1 is adapted to be governed by or freed from the movements of cable C—2 (as transmitted by bell crank L—1 and shaft S—1), depending upon whether rich gas or lean gas is used. Thus, when using lean gas, valve D—1 remains closed.

Cable C—2 is connected to shaft S—2 of valve box A—2 by means similar to the means connecting cable C—1 to shaft S—2 of box A—1, described above. Upon the bottom of each side of box A—2, however, there are two ports. The larger one D—23 opens into passage P—3, which connects it with chimney flue C. The smaller port D—43 opens into riser G—21 from lean fuel gas manifold G—1. Keyed to shaft S—2 within the valve chest is the fulcrum of a bell crank L—4, its two arms forming the valve stems D—25 and D—45, respectively, of two valves D—2 and D—4. Valve D—2 is the waste gas exit damper, and its face D—21 is adapted to make a substantially air-tight contact with the seat D—22 of port D—23. Similarly, the face D—41 of lean gas inlet valve D—4 is adapted to make a substantially air-tight contact with the seat D—42 of port D—43. The length and shape of the arms of the bell crank are so constructed that travel of cable C—2 to the left closes valve D—2 and opens valve D—4, while travel to the right closes valve D—4 and opens valve D—2. In the right hand half of the valve box, since the levers are reversed, travel of cable C—2 to the left opens the waste gas valve and closes the lean gas valve, whereas travel to the right has the opposite effect.

As in passage P—5, a rectangular damper D—3 is placed in passage P—3 and is adapted to close off this passage, as required.

The reversing mechanism for operating the lean gas and waste gas dampers is, of course, the same as briefly described in connection with the air and waste gas dampers of the other box. There is also a valve D—5 (see also Fig. 7) in each riser, G—21 and G—22, from the lean gas manifold G—1, and this valve is adapted to shut off the gas supply and to prevent leakage into valve box A—2 when rich gas is being used for underfiring.

Reference to Figs. 1 and 7 will disclose a valve D—6 in the lean gas manifold G—1. Valve D—6 is used momentarily during each reversal period in order completely to shut off the lean gas from manifold G—1 until reversal has taken place. The closing of this valve prevents any lean gas from flowing into valve box A—2 through G—21 or G—22 and on out to the chimney flue through passage P—3 while both the lean gas inlet valves and the waste gas outlet valves are partly open during the process of reversing. Valve D—6 may be of any suitable type and may be operated by any appropriate means, as by a solenoid electrically connected in the usual manner with the clock-operated reversing valve mechanism.

In the operation of the oven as an entire unit, oven doors H—3 and H—4 are closed and sealed air-tight, as may be seen from Fig. 2. Coal is charged through the charging holes H—2 in the top of the oven (see also Fig. 3), and the cone-shaped piles are levelled off in the usual manner by a levelling rod K, introduced through a small door H—7 in the pusher side oven door. The charging hole covers H—5 are replaced and sealed air-tight. Fuel gas is then burned with preheated air in the flues underneath the coking chamber to provide a substantially uniform coking temperature for the entire area of the oven sole upon which the coal charge is supported. As is well-known by those skilled in the art, the coking temperature varies depending upon whether low or high carbonization is desired. Thus, a suitable temperature for low coking, such as about 600 to about 700° C. to a suitable temperature for high coking, for instance, about 1150 to about 1450° C., can be successfully used. Reversal periods of suitable duration are employed, as those skilled in the art will know, and a reversal about every 15 minutes has been found to give satisfactory results when underfiring with rich fuel gas and preheated air. When preheated lean fuel gas is burned in the flues with preheated air, a reversal of about 30 minutes duration gives more satisfactory results. An off-take pipe H—6 at the end of the oven provides an outlet for the gases evolved during coking, and these pass to the by-product plant. When the coal is coked, oven doors H—3 and H—4 are removed, and the coke is pushed in the customary way.

Figure 19:
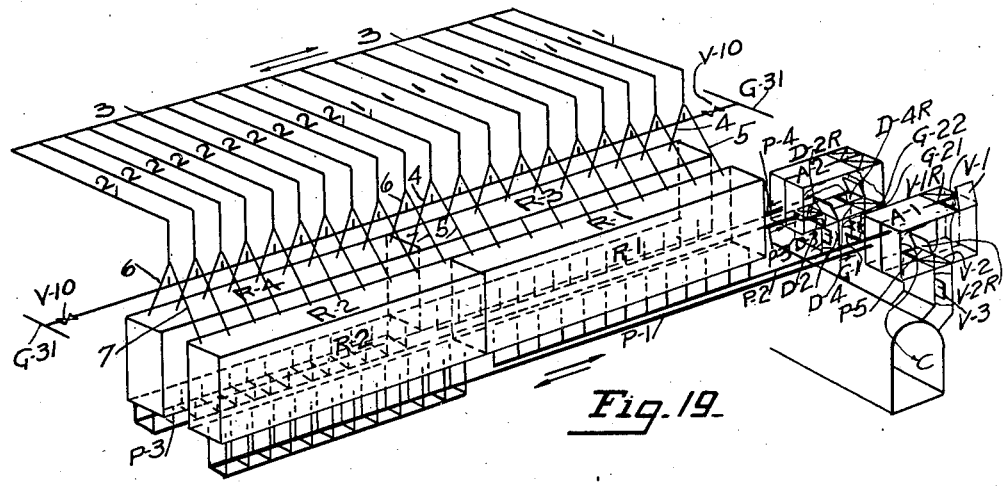
Fig. 19 illustrates a perspective view, showing the circulation through the heating flues, regenerators, air boxes, gas boxes, fuel gas manifolds and single chimney flue when underfiring with preheated lean fuel gas and preheated air.

The operation of this improved broad coke oven will now be described particularly in conjunction with Figs. 18 and 19, which illustrate diagrammatically the flow of gases through the several flues, ducts, regenerators, dampers and valves, for the convenience of those skilled in the art.

When using lean fuel gas (Fig. 19), and assuming that regenerators R—2 and R—4 are being heated by the outgoing gases of combustion, waste gas damper D—2 (see also Fig. 13) on the left side of valve box A—2 is open, and fuel gas inlet valve D—4 on the same side of the box is closed, permitting a flow of waste gas from regenerator R—4 along passage P—3 and through the left side of the valve box A—2 into chimney flue C. Likewise, waste gas damper V—2R (see also Fig. 9) in the right side of valve box A—1 is open, and air inlet valve V—1R on the same side of the box is closed, permitting waste gas to flow from regenerator R—2 along passage P—1 and through the right side of valve box A—1 into chimney flue C.

The lean gas to be preheated enters through valve D—4R in the right side of valve box A—2, waste gas damper D—2R on that side being closed. The gas flows along passage P—4 into the mushrooming chamber under regenerator R—3, where it spreads out, and then ascends uniformly through the hot checkerbrick in the regenerator, passing into ducts 4. Similarly, the air to be preheated enters through valve V—1 on the left side of the valve box A—1, waste gas damper V—2 on that side being closed. The air then flows along passage P—2 into the spacious chamber below regenerator R—1, where it mushrooms out, and then uniformly up through the hot checkerbrick. The heated air passes into the ducts 5 and, at the debouchment points of ducts 4 and 5 into heating flues 1, meets the hot fuel gas. (This point is the same as that for ducts 6 and 7 and flue 2 and is shown in detail at Fig. 21.) It will be observed that provision of relatively large gas spaces above and below the regenerators permits the gas (here, air) to spread out before entering the checkerbrick and thus slows down its passage through the regenerators, giving improved heat transfer. This preheated air is delivered at the firing end of each heating flue 1 in an amount suitable for the combustion of the preheated lean gas delivered there, and gas and air are mixed in the heating flues, so that combustion takes place simultaneously in all heating flues 1.

It is obvious from the construction of the heating flues, as detailed supra, that each heating flue 1 will have its own flame shooting across the width of the oven, a very short distance to travel. The products of combustion from heating flues 1 enter longitudinal flue 3 and, through flue 3, are introduced into the remaining heating flues 2. At the other end of flues 2, the volume of waste gas is divided between ducts 6 and 7 and flows downward into the mushrooming chambers above R2 and R4. These waste gases descend uniformly and at reduced velocity through the regenerators, giving up most of their heat to the checkerbrick, and flow into passages P—1 and P—3, whence they go to the stack, as above described. Thus, it will be observed that the oven of the invention is constructed in such manner that the gases which are being heated ascend and the gases which are giving up heat descend, whereby maximum heat economy and uniformity of operation are assured.

Upon reversal of the draft, with preheated gas and air entering heating flues 2 through ducts 6 and ducts 7, respectively, the flames burn simultaneously in flues 2, at the other end of the oven. From flues 2, the hot products of combustion pass into flue 3 and thence into heating flues 1. In this way, first one half of the oven and then the other is subjected to the highest temperature, so that the heat furnished throughout a full cycle is substantially uniform for the entire oven length. The center is obviously under exactly the same conditions as are the ends, so that there can be neither overcoking at the ends of the oven nor undercoking at its center. Besides that, no cold black spots are possible in the short transverse flues.

When the regenerators R—2 and R—4 are raised to the temperature necessary for preheating the lean gas and air, the directions of flow are changed by opening gas inlet valve D—4, air valve V—1R, and waste gas dampers D—2R and V—2, while closing lean gas valve D—4R, air valve V—1, and waste gas valves D—2 and V—2R. Air then enters through valve V—1R and flows through passage P—1 and up through regenerator R—2 into ducts 7. Lean gas enters through valve D—4 and flows through passage P—3, up through regenerator R—4, and into ducts 6. After burning in flues 2, the waste products flow down through regenerators R—1 and R—3 and out the dampers D—2R and V—2 into the single chimney flue C.

The operation of the air valve boxes is clear from Figs. 9 to 12. In the position shown, cable C—1 has traveled to the left, moving the straight arm of bell crank L—1 in the same direction. The bell crank has turned shaft S—1 to which it is keyed. This movement of the shaft has raised valve V—1 from its seat. The curved arm of bell crank L—1 has been moved downward in an arc and has pushed down upon adjustable rod L—2, which has in turn depressed lever L—3. Lever L—3 has turned shaft S—2, to which it is keyed, and this in turn has lowered damper V—2 into its seat. In similar but reverse fashion, the travel of cable C—1 to the left has opened damper V—2R and closed air inlet valve V—1R. These positions are illustrated also by the seventh valve box (the air box for the fourth oven) in Fig. 7, which shows the arrangement of the boxes when cable C—1 has traveled to the left and cable C—2 has traveled to the right. It will be seen that each air box has one air valve open and the other closed, the open valve being left or right depending upon whether the box is operated by cable C—1 or C—2. This order is of course reversed by reversal of travel of the cables. It is also to be noted that both air valves D—1 and D—1R on the lean gas valve boxes are closed, as they remain during operation with lean gas.

The operation of the lean gas valve boxes is clear from a scrutiny of Figs. 13 to 17. As shown, cable C—2 has traveled to the right, moving the straight arm of bell crank L—1 in the same direction. As the valve stem D—15 has been unkeyed from the shaft S—1 to which the bell crank is keyed, there is no movement of air valve D—1, which remains tightly closed. The curved arm of bell crank L—1 has been moved upward in an arc and has pulled up upon adjustable rod L—2, which has in turn raised lever L—3. Lever L—3 has turned shaft S—2, to which it is keyed, and this in turn has turned bell crank L—4. The movement of bell crank L—4 has both closed lean fuel gas valve D—4 and opened waste gas valve D—2. In similar but reverse operation, the travel of cable C—2 to the right has opened gas inlet valve D—4R and closed waste gas damper D—2R. The travel of the cable to the left has the opposite effect.

Stack draft is used for drawing air into the regenerators and for removing the gases of combustion. The stack draft for each separate coke oven is regulated by the position of the plate dampers V—3 and D—3, which are held in position in the passages to the chimney flue by quadrants Q. The air valves are equipped with air-regulating bars B, as mentioned supra. Bars B are removable, and the volume of air to each regenerator is controlled by the size and number of removable bars used to regulate the size of the opening into the body of the box. In providing lean gas for heating the ovens, the fuel gas, under a slight and constant pressure, is conducted through supply manifold G—1 and into risers G—21 and G—22 (see also Fig. 3). Its supply to the burners is regulated by brick slides N—3 in the ducts which connect the regenerators with the heating flues, as described supra and illustrated at Fig. 21.

Figure 18:
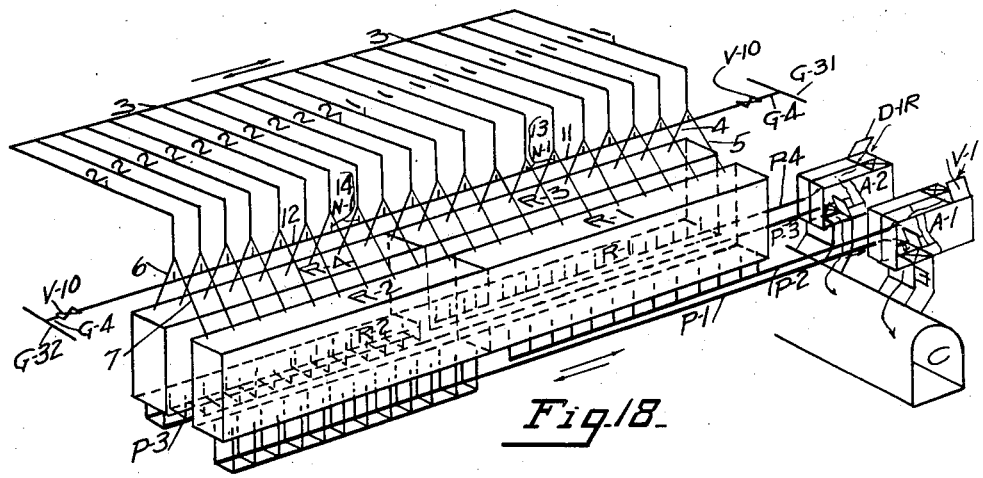
Fig. 18 depicts a perspective view, showing the circulation through the various parts of the oven construction when underfiring the oven with rich fuel gas and preheated air.

The adjustment of the various valves and the circulation of gases through the heating flues, regenerators, and other associated parts when using rich fuel gas and preheated air will be best understood from Fig. 18. When using rich fuel gas and preheated air, all connections are the same as described for lean fuel gas, except that the rich fuel gas is not preheated and that all regenerators are used alternately for either preheating air or for being heated by the hot waste gases. Assuming that regenerators R—2 and R—4 are being heated by the outgoing hot gases of combustion, air to the preheated enters through dampers V—1 and D—1R and is introduced by means of passages P—2 and P—4, respectively, into the regenerators R—1 and R—3, in which the air ascends. After having passed through the regenerators, the preheated air is brought into heating flues 1 through ducts 4 and 5. The rich fuel gas is introduced through a gas manifold G—31 and a riser G—4 into gun brick 11. The gas passes through burner nozzles N—1 in ducts 13 to heating flues 1, where it mixes with the preheated air from ducts 4 and 5 and is burned. The products of combustion from heating flues 1 enter common connecting flue 3 and are divided again among flues 2. The volume of waste gas flowing through flues 2 is divided again between flues 6 and 7 and flows downward through regenerators R—2 and R—4, along passage P—1 and P—3, and out of the valve boxes into chimney flue C.

During the alternate reversal, regenerators

R—1 and R—3 are being heated, and the air is being preheated in regenerators R—2 and R—4. During this reversal, the rich fuel gas is shut off from gun brick gas supply channel 11 and ducts 13 and flows, instead, through gas manifold pipe G—32, gun brick 12 and nozzles N—1 in ducts 14. Combustion now takes place in heating flues 2, the waste gas flowing through flue 3 out flues 1 into regenerators R—1 and R—3.

The operation of the air valve boxes is, of course, exactly the same as when lean gas is being used, as detailed in connection with Figs. 9 to 12, supra. The valve boxes A—2, employed for lean gas when it is desired to use lean gas for fuel, are now converted into additional air boxes by adjusting set screws D—16 and D—16R on each box (see Fig. 13), thus keying the air valves D—1 and D—1R to the bell cranks L—1 and L—1R. In this way, the travel of cable C—2 to the right opens air valve D—1R just as C—1, traveling to the left, opens air valve V—1, and air passes to both regenerators R—1 and R—3 to be preheated. No lean gas is used, of course, and hence the opening of valve D—4R leading to the lean gas manifold (described supra in connection with Figs. 13 to 17) has no effect on the system, the manifold being sealed off by the closing of the valves D—5 in the risers. The travel of cable C—2 to the right opens waste gas valve D—2 in box A—2, just as in operation with lean gas. Travel to the left of the cable reverses the operations.

It will be appreciated by those skilled in the coke oven art from the foregoing description that a convertible broad coke oven constructed to carry out the process of my invention possesses extreme simplicity of operation. Furthermore, it is to be noted that the ease with which the operator can change over from lean gas, such as producer or blast furnace gas, to rich gas, such as coke oven gas, or vice versa, in this convertible broad coke oven has never before been even approached by the prior attempts or proposals. The foregoing, with the other advantageous features described herein, gives my novel and improved process combination a flexibility of operation never before attained by the coke oven art.

It will also be appreciated that, according to my novel process, it is possible to produce a coke which is far more suitable for domestic purposes than was the coke produced by the processes employed in the high, narrow ovens of the prior art. The pressure in the plastic mass resulting from a deep, narrow charge materially affected the coke structure, so that a hard, dense, slow-burning coke having a close cell structure was necessarily produced. Such coke was really only suitable for metallurgical purposes, although the surplus was sold for domestic uses. Coke for domestic use should have an open, free-burning cell structure, and this type of coke can be made by my process. Leveling off the coal charge in an oven using my process over the entire horizontal heating surface gives a thin layer of about 10 to about 18 inches in depth spread evenly over a surface about 35 to about 45 feet long and about 8 to about 12 feet wide. The free flow of hot, evolved gases through the thin coal charge and the low pressure to which the coal in the plastic state is subjected create entirely different carbonizing conditions from those prevailing in the high, narrow ovens. An open cell structure results, and, in addition to the fact that a different molecular arrangement of the coke structure is developed, the carbonizing reaction is accompanied by less than the amount of cracking of by-products which resulted from contact with the hot, vertical surfaces of the prior art. Thus, the broad, flat oven herein described in connection with my improved process can be operated to leave a suitable volume of volatile matter in the coke to insure the free-burning properties desirable in domestic coke. It will, of course, be understood that an appropriate mixture of coals can as readily produce a high grade metallurgical coke by my novel process, so that my process has the great advantage of being adaptable to the production of either domestic or metallurgical coke.

Although the present invention has been disclosed in connection with a preferred oven construction for carrying out the same, variations and modifications of this construction may be resorted to by those skilled in the art, without departing from the principles of the invention. Thus, while a preferred arrangement of valves has been described and a preferred reversing mechanism for their operation has been indicated, those skilled in the coke oven art will readily perceive that other operative valvular means could be substituted for my arrangement, and that other valve-actuating means could be used with satisfactory results. It will also be observed that, while I have preferred to employ a regenerative system under each oven which comprises two sets of vertical regenerators with each set comprising two regenerators as a single parallel pair, sets of more than one pair could be satisfactorily used with relatively minor alterations and adjustments. Moreover, while I have described my invention particularly with reference to the coking of coal, it will be readily understood that it is as easily adaptable to the coking of any carbonaceous material, such as peat, tar, lignite, pitch, culm waste and other low grade coals, fuel oil, bunker oils and other petroleum products, and the like. I consider all of these variations and modifications as within the true spirit and scope of the present invention, as disclosed in the foregoing description and defined by the appended claims.

The present application is a division of my copending application, Serial No. 301,173, filed October 25, 1939, and entitled Broad coke ovens, now Patent No. 2,234,172.

I claim:

1. The process of coking carbonaceous material in a coking chamber of a long, rectangular oven broader than its height, which comprises introducing carbonaceous material into said coking chamber; spreading said carbonaceous material onto the sole of said coking chamber in a layer that is thinner than its width and length; sealing said oven against the admission of air; originating at predetermined space intervals along a portion of one side of the sole of said coking chamber and transversely thereof, a flow of hot combustion gases to furnish heat at a temperature sufficient to coke said carbonaceous material on the sole of said coking chamber; conducting said flow of hot combustion gases under a portion of the area of the sole of said coking chamber in a plurality of substantially parallel unidirectional individual streams, said streams having their ends at predetermined space intervals along a portion of the side of the sole of said coking chamber opposite to the side where the flow of hot combustion gases originated; merging the ends of said plurality of substantially parallel unidirectional individual streams to combine the flow of hot combustion gases into a single stream underneath the side of the sole of said coking chamber opposite to the side where the flow of hot combustion gases originated and substantially perpendicular to said plurality of substantially parallel unidirectional individual streams; dividing the flow of hot combustion gases in said single stream into another plurality of substantially parallel unidirectional individual streams of hot combustion gases under the remaining portion of the area of the sole of said coking chamber and transversely thereof, said streams having their ends at predetermined space intervals along the remaining portion of the side of the sole of said coking chamber where the flow of hot combustion gases originated and wherein the direction of flow is opposite to the direction of flow in the first plurality of substantially parallel unidirectional individual streams, whereby substantially the total area of the sole of said coking chamber can be sufficiently heated for full coking; alternately reversing the directions of flow of hot combustion gases in said single stream and said pluralities of substantially parallel individual streams, whereby uniform heating conditions over substantially the total area of the sole of said coking chamber can be attained and whereby hot spots and partly undercoking and partly overcoking of the carbonaceous material on the sole of said coking chamber are avoided; and continuing said alternate reversals until the entire volume of the layer of carbonaceous material is fully coked, whereby carbonaceous material is coked substantially uniformly.

2. The process of coking carbonaceous material in a coking chamber of a long rectangular oven broader than its height, which comprises introducing carbonaceous material into said coking chamber; spreading said carbonaceous material onto the sole of said coking chamber in a layer that is thinner than its width and length; sealing said oven against the admission of air; originating at predetermined space intervals along a portion of one side of the sole of said coking chamber and transversely thereof, a flow of preheated combustion air; conducting said flow of preheated combustion air under a portion of the area of the sole of said coking chamber in a plurality of substantially parallel unidirectional individual streams, said streams having their ends at predetermined space intervals along a portion of the side of the sole of said coking chamber opposite to the side where the flow of preheated combustion air originated; merging the ends of said plurality of substantially parallel unidirectional individual streams to combine the flow of preheated combustion air into a single stream underneath the side of the sole of said coking chamber opposite to the side where the flow of preheated combustion air originated and substantially perpendicular to said plurality of substantially parallel unidirectional individual streams; dividing the flow of preheated combustion air in said single stream, under the remaining portion of the area of the sole of said coking chamber and transversely thereof, into another plurality of substantially parallel unidirectional individual streams of preheated combustion air, said streams having their ends at predetermined space intervals along the remaining portion of the side of the sole of said coking chamber where the flow of preheated combustion air originated and wherein the direction of flow is opposite to the direction of flow in the first plurality of substantially parallel unidirectional individual streams; introducing rich fuel gas at the point of origin of each stream in the first-mentioned plurality of substantially parallel unidirectional individual streams of preheated combustion air; burning said rich fuel gas in said first-mentioned plurality of substantially parallel unidirectional individual streams, said single stream, and said second-mentioned plurality of substantially parallel unidirectional individual streams of preheated combustion air to propagate therewith a plurality of substantially parallel flames that travel in one direction and transversely of said coking chamber in said first-mentioned plurality of substantially parallel unidirectional individual streams, merge into a single flame longitudinally of said coking chamber in the single stream, and travel in a direction that is opposite to the initial direction and transversely of said coking chamber in the second-mentioned plurality of substantially parallel unidirectional individual streams, to produce hot combustion gases to furnish heat at a temperature sufficient to coke said carbonaceous material on the sole of said coking chamber, whereby substantially the total area of the sole of said coking chamber can be sufficiently heated for full coking by rich fuel gas burning with preheated combustion air at a single side of the coking oven; alternately reversing the directions of flow of preheated combustion air in said pluralities of substantially parallel individual streams and in said single stream, and alternately introducing rich fuel gas at the point of origin of each stream in a plurality of substantially parallel unidirectional individual streams of preheated combustion air upon reversal of the flow of preheated combustion air therein, whereby uniform heating conditions over substantially the total area of the sole of said coking chamber can be attained and whereby hot spots and partly undercoking and partly overcoking of the carbonaceous material on the sole of said coking chamber are avoided; and continuing said alternate reversals until the entire volume of the layer of carbonaceous material is fully coked, whereby carbonaceous material is coked substantially uniformly.

3. The process of coking carbonaceous material in a coking chamber of a long rectangular oven broader than its height, which comprises introducing carbonaceous material into said coking chamber; spreading said carbonaceous material onto the sole of said coking chamber in a layer that is thinner than its width and length; sealing said oven against the admission of air; originating at predetermined space intervals along a portion of one side of the sole of said coking chamber and transversely thereof, a flow of preheated combustion air; conducting said flow of preheated combustion air under a portion of the area of the sole of said coking chamber in a plurality of substantially parallel unidirectional individual streams, said streams having their ends at predetermined space intervals along a portion of the side of the sole of said coking chamber opposite to the side where the flow of preheated combustion air originated; merging the ends of said plurality of substantially parallel unidirectional individual streams to combine the flow of preheated combustion air into a single stream underneath the side of the sole of said coking chamber opposite to the side where the flow of preheated combustion air originated and substantially perpendicular to said plurality of substantially parallel unidirectional individual streams; dividing the flow of preheated combustion air in said single stream, under the remaining portion of the area of the sole of said coking chamber and transversely thereof, into another plurality of substantially parallel unidirectional individual streams of preheated combustion air, said streams having their ends at predetermined space intervals along the remaining portion of the side of the sole of said coking chamber where the flow of preheated combustion air originated and wherein the direction of flow is opposite to the direction of flow in the first plurality of substantially parallel unidirectional individual streams; introducing preheated lean fuel gas at the point of origin of each stream in the first-mentioned plurality of substantially parallel unidirectional individual streams of preheated combustion air; burning said preheated lean fuel gas in said first-mentioned plurality of substantially parallel unidirectional individual streams, said single stream, and said second-mentioned plurality of substantially parallel unidirectional individual streams of preheated combustion air to propagate therewith a plurality of substantially parallel flames that travel in one direction and transversely of said coking chamber in said first-mentioned plurality of substantially parallel unidirectional individual streams, merge into a single flame longitudinally of said coking chamber in the single stream, and travel in a direction that is opposite to the initial direction and transversely of said coking chamber in the second-mentioned plurality of substantially parallel unidirectional individual streams, to produce hot combustion gases to furnish heat at a temperature sufficient to coke said carbonaceous material on the sole of said coking chamber, whereby substantially the total area of the sole of said coking chamber can be sufficiently heated for full coking by preheated lean fuel gas burning with preheated combustion air at a single side of the coking oven; alternately reversing the directions of flow of preheated combustion air in said pluralities of substantially parallel individual streams and in said single stream, and alternately introducing preheated lean fuel gas at the point of origin of each stream in a plurality of substantially parallel unidirectional individual streams of preheated combustion air upon reversal of the flow of preheated combustion air therein, whereby uniform heating conditions over substantially the total area of the sole of said coking chamber can be attained and whereby hot spots and partly undercoking and partly overcoking of the carbonaceous material on the sole of said coking chamber are avoided; and continuing said alternate reversals until the entire volume of the layer of carbonaceous material is fully coked; whereby carbonaceous material is coked substantially uniformly.

4. In the process of coking carbonaceous material in a broad coking chamber of a low, long, rectangular oven comprising introducing carbonaceous material into said broad coking chamber, spreading said carbonaceous material onto the sole of said broad coking chamber in a layer that is thinner than its width and length, sealing said oven against the admission of air, and establishing a flow of hot combustion gases under the sole of said broad coking chamber to furnish heat at a temperature sufficient to coke said carbonaceous material on the sole of said broad coking chamber, the improvement which comprises originating at predetermined space intervals along a portion of one side of the sole of said broad coking chamber and transversely thereof, a flow of hot combustion gases to furnish heat at a temperature sufficient to coke said carbonaceous material on the sole of said coking chamber; conducting said flow of hot combustion gases under a portion of the area of the sole of said broad coking chamber in a plurality of substantially parallel unidirectional individual streams, said streams having their ends at predetermined space intervals along a portion of the side of the sole of said broad coking chamber opposite to the side where the flow of hot combustion gases originated; merging the ends of said plurality of substantially unidirectional individual streams to combine the flow of hot combustion gases into a single stream underneath the side of the sole of said broad coking chamber opposite to the side where the flow of hot combustion gases originated and substantially perpendicular to said plurality of substantially parallel unidirectional individual streams; dividing the flow of hot combustion gases in said single streams under an adjacent portion of the area of the sole of said broad coking chamber and transversely thereof, into another plurality of substantially parallel unidirectional individual streams of hot combustion gases, said streams having their ends at predetermined space intervals along a portion of the side of the sole of said broad coking chamber adjacent the portion where the flow of hot combustion gases originated and wherein the direction of flow is opposite to the direction of flow in the first plurality of substantially parallel unidirectional individual streams, whereby substantially the total area of said adjacent portions of the sole of said broad coking chamber can be sufficiently heated for full coking; alternately reversing the directions of flow of hot combustion gases in said single stream and said pluralities of substantially parallel individual streams, whereby uniform heating conditions over substantially the total area of said adjacent portions of the sole of said broad coking chamber can be attained and whereby hot spots and partly undercoking and partly overcoking of the carbonaceous material on said adjacent portions of the sole of said broad coking chamber are avoided; and continuing said alternate reversals until the entire volume of the layer of carbonaceous material above said adjacent portions of the sole of the broad coking chamber is fully coked.

CHARLES H. HUGHES.